(12) United States Patent
Telle (10) Patent No.: US 6,496,274 B1
(45) Date of Patent: Dec. 17, 2002

(54) SCANNER WITH PREPRESS MODE (75) Inventor: Lawrence B. Telle, Rochester, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/717,713

(22) Filed: Nov. 21, 2000

Related U.S. Application Data (60) Provisional application No. 60/204,943, filed on May 17, 2000.

(51) Int. Cl.[7] .................................................. G06K 1/00
(52) U.S. Cl. ........................................ 358/1.1; 358/1.16
(58) Field of Search ........................... 358/1.1, 1.2, 1.3, 358/1.16, 1.17, 404, 444, 451, 452, 474; 382/254, 298, 299, 300, 305

(56) References Cited

U.S. PATENT DOCUMENTS

| | | | |
|---|---|---|---|
| 4,468,755 A | | 8/1984 | Iida |
| 4,533,942 A | | 8/1985 | Gall et al. |
| 4,833,625 A | | 5/1989 | Fisher et al. |
| 4,989,163 A | * | 1/1991 | Kawamata et al. ........ 358/1.16 |
| 5,204,959 A | * | 4/1993 | Sakuragi ..................... 358/1.2 |
| 6,147,770 A | * | 11/2000 | Unrishi et al. ............... 358/1.2 |

FOREIGN PATENT DOCUMENTS

| | | |
|---|---|---|
| EP | 0 009 378 A | 4/1980 |
| EP | 0 246 010 A | 11/1986 |
| GB | 2 117 902 A | 10/1983 |

* cited by examiner

Primary Examiner—Arthur G. Evans (57) ABSTRACT

A scanning device includes an automatic document handler for stream feeding in serial fashion hard copy original pages to a platen or scanning station to be automatically read by the image scanner into electrical signals or data. The raw image data is stored in a memory buffer. An operator may use the data in this buffer to manipulate the image electronically before using the image for further processing, such as printing or publishing.

15 Claims, 12 Drawing Sheets

SCANNER WITH PREPRESS MODE

This application claims benefit of provisional application No. 60/204,943 filed May 17, 2000.

FIELD OF THE INVENTION

The present invention relates to scanning devices, and in particular, a scanner that saves raw scanned data in an image buffer for utilization in a prepress image manipulation mode.

BACKGROUND OF THE INVENTION

The terms used herein have the same meanings as in the digital printing and scanning sciences. Likewise, it will be understood that the usefulness of the present inventions and discoveries is not limited to these, although it is in connection with such that the inventions hereof presently have principal usefulness. The term "invention" will be understood to be inclusive of discovery.

In document scanning, a user scans his original and captures a digital image in a host computer or workstation. If the image captured isn't acceptable for printing or otherwise publishing, the scanner parameters are adjusted and the image is rescanned and processed. If the user captured the image in full resolution, he/she may use the captured image and process the image in many different ways on the host system. The time it will take to make and process the adjustments can be quite long due to the large image processing activity required by the host workstation. Image adjustment to compensate for scanner parameters is therefore cumbersome and time consuming.

The problem is further exasperated in the field of high volume scanners. These type of scanners take a stack of original documents and feed them seriatum through an image capturing device. If any of the scanned image is not acceptable due to scanner parameters, the entire stack of originals must be reloaded and rescanned in order to maintain the unacceptable images in their proper order.

A further problem with scanners is their utilization in image or document enlargement/reduction operations, known as scaling. Typically, enlargement scaling is achieved by decreasing the scanner motor speed, which reduces the speed by which the original is passed by the scanning head. This method is used since the image processing hardware has a fixed maximum bandwidth. The increased processing time needed is directly proportional to the scale factor. For example, a 200% enlargement increases the amount of processing time by 200%, thus the motor speed is cut to half speed. For scanners supporting 400% enlargement, the motor control system must be able to operate properly and smoothly over the range of one fourth speed to full speed. Another way of looking at this range is the maximum scanning speed is three times the slowest scanning speed. This method of scaling also suffers due to finite impulse response (FIR) filtering problems. FIR filters are designed for a specific image aperture. By changing the scanning speed the intrack aperture has effectively been changed. The filters can be changed to accommodate different aperture, but supporting a FIR filter that is not symmetrical is not a simple task or cost effective solution.

Efforts regarding such systems have led to continuing developments to improve their versatility, practicality and efficiency.

DISCLOSURE OF THE INVENTION

An object of the present invention is to provide a scanner which stores raw image data in an data buffer, and provides an operator the opportunity to review the raw data and manipulate it in a prepress mode prior to printing or otherwise reproducing the image.

Another object of the present invention is to provide a scanner which permits scaling without changing scanner motor speed.

According to the present invention, a scanning system operated by an operator to convert printed material to electronic data utilized by a reading device including a transducer to convert light into raw digital image data (DID); an image processor to receive the raw DID and manipulate the raw DID and to provide manipulated DID; an output data path to provide data to the reading device; a memory buffer to store data; and, a controller to control whether the DID is stored in the memory buffer, or is manipulated by the image processor, or is provided on the output data path, or is manipulated by the image processor then stored in the memory buffer.

The present invention provides a useful prepress mode for a scanner, since not all scans are acceptable to a viewer the first time. Permitting an operator the ability to review a scanned image, edit it, and rereview without an additional scan is highly beneficial.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 7 is a flowchart of operation of a scanner in accordance with the present invention.

DETAILED DESCRIPTION

Figure 1:
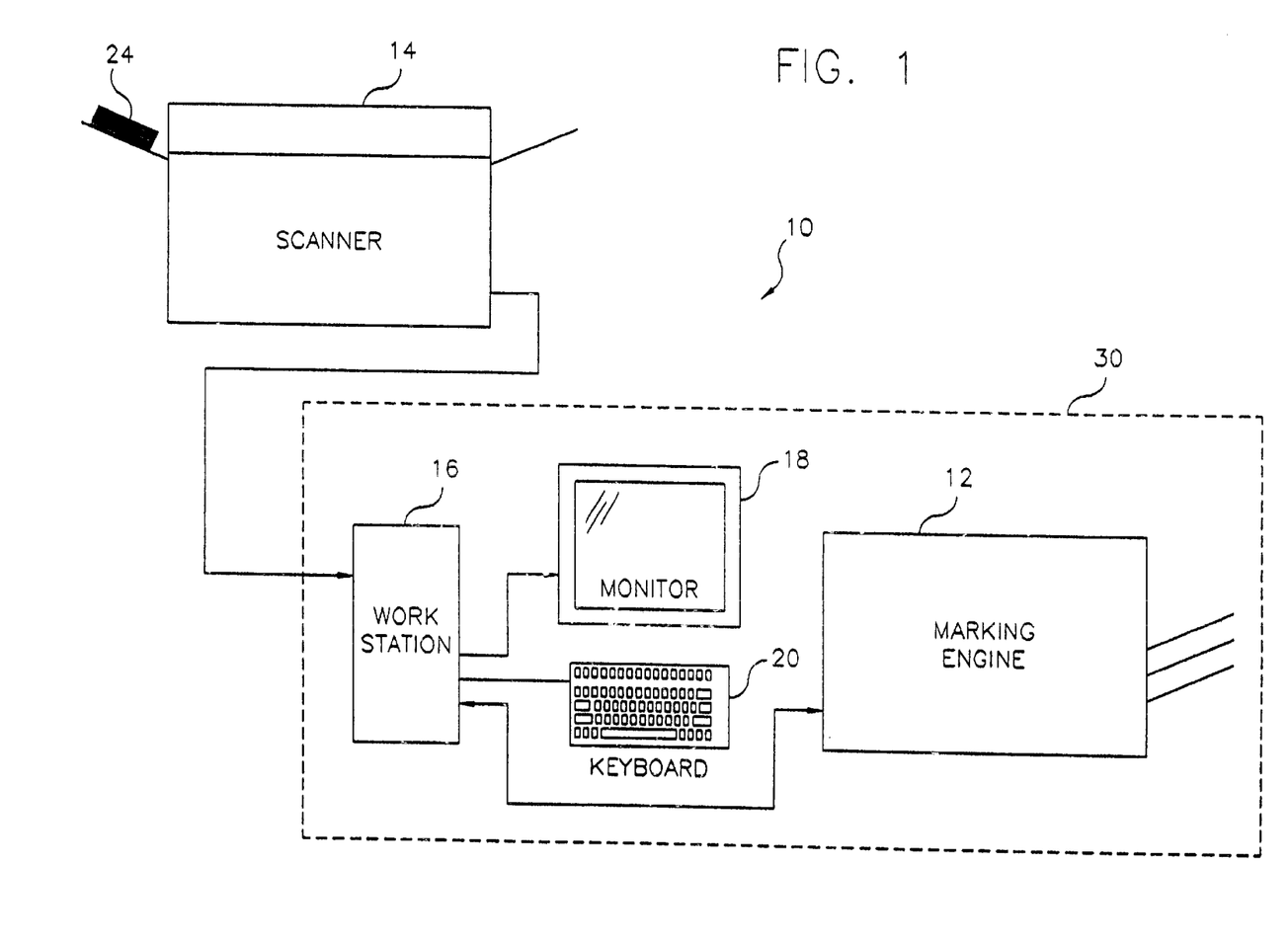
FIG. 1 is a schematic block diagram of an image reproduction system in accordance with the present invention.

Referring now to the drawings wherein like reference numerals designate like or corresponding parts throughout different views, there is shown in FIG. 1 a digital copier/printer reproduction system 10 which includes a print (or marking) engine 12, an original document reader, or scanner 14, a computer or workstation 16, having an operator interface such as a monitor 18 and a keyboard 20. Marking engine 12, workstation 16, monitor 18 and keyboard 20 either collectively or individually comprise a user block 30, for accepting digital image data output from the scanner 14, and reproducing it in some fashion. A digital printer is a print engine that accepts digital image data and prints images represented by the data onto a medium, such as paper. A typical usage of scanner 14 is to scan original documents, provide the digital rendition of the documents to an operator for observation, which data will subsequently be sent to a print engine for reproduction onto paper.

Scanner 14 functions similar to a conventional copier in that the original document is first illuminated by a lamp. Light is reflected from the light and dark areas of the image on the original (document), in proportion to the lightness of the original. The light is passed by mirrors and focussed by the lens on the photodetector elements. The image is sequentially resolved into small points (called picture elements, or pixels) by the photodetector elements which convert the light into a proportional electrical signal at each point. Various types of phototelectric converters exist, including photodiodes, phototransistors, and Charge-Coupled Devices (CCD). In this way, the tones of the original are resolved into a pattern of proportional, sequential voltages. The sequential electrical signal received from the CCD represents in analog form the image density recorded by each pixel. It is then converted to an equivalent digital signal by an A/D converter. If the image of the original consists of only blacks and whites, an output of only 1 bit (one signal line) is sufficient to indicate the full range of tones. It is preferred, however, that grays be reproduced also. With an output of 2 bits, values can be represented by four different combinations of "1" and "0", namely "00", "01", "10", and "11". Consequently, as the density of the original varies from white to gray to black, the input signal (analog) will change accordingly. A 2 bit output allows that range to be divided into four steps for conversion to a digital signal. If a 4 bit output is used, 16 steps are possible. It will be appreciated that a digital signal with a larger number of output bits can give a more accurate representation of the different densities of the original. However, increasing the number of output bits requires an increase in memory capacity and computing power to handle the increased amount of data generated by the scanning operation. The present invention, for instance, permits 8 or more bit output.

After the individual voltages have been converted into an electrical signal, electronic circuitry in an image processor can change the image through signal processing. The scanner therefore produces a series of electrical signals representative of the image content of original document sheets 24. After image processing, the electrical signal goes via a transmission cable to a user device, such as a printer unit or other user interface device such as a computer for display.

Scanner 14 also is comprised of an automatic document handler for stream feeding in serial fashion hard copy original pages to a platen or scanning station to be automatically read by the image scanner such as a linear array of solid state charge-coupled devices (CCD). In lieu of feeding document sheets to the platen or scanning station, documents such as books or sheets may be placed on the platen.

Figure 2:
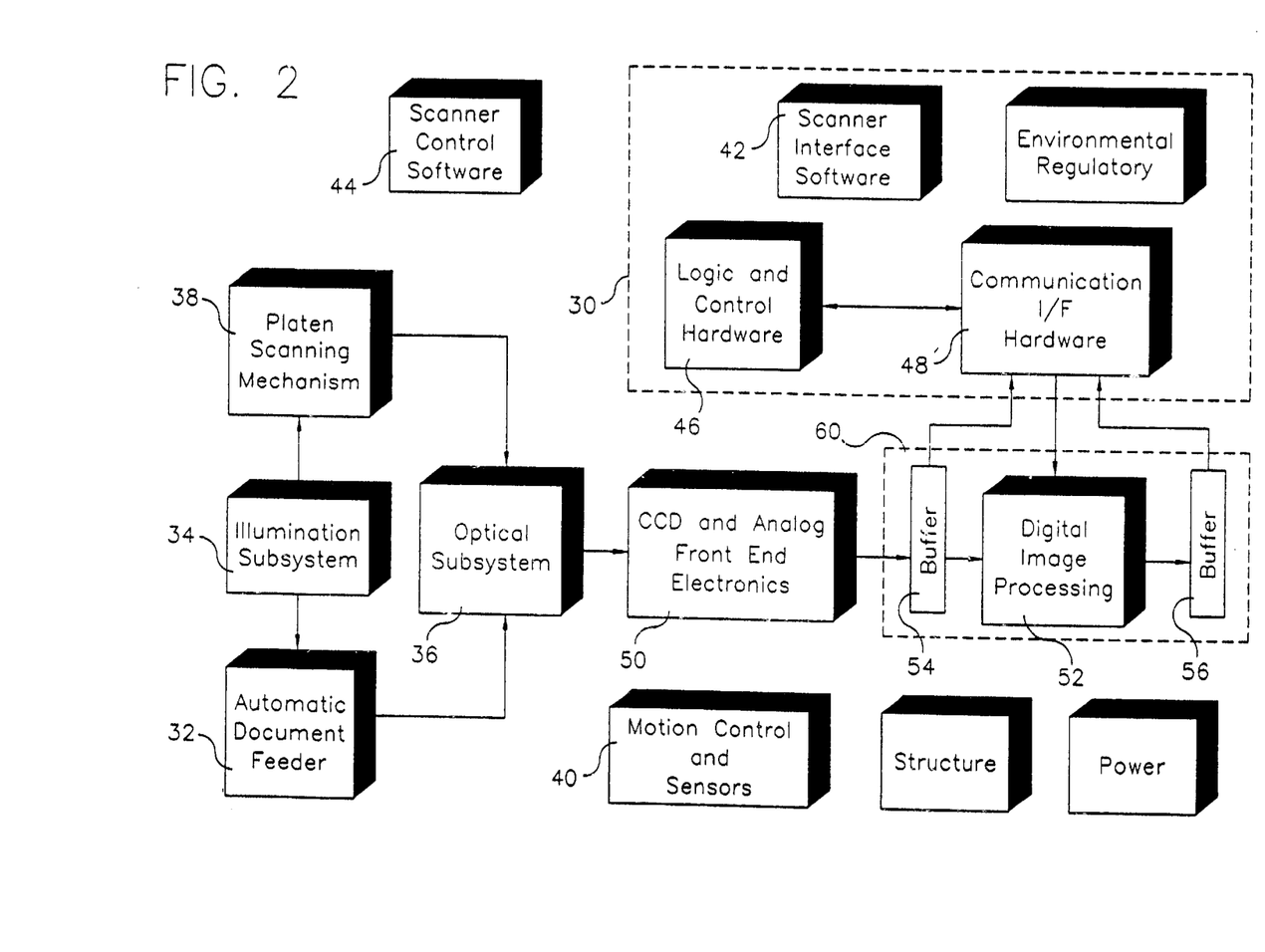
FIG. 2 is a schematic diagram of the functional blocks provided within a scanner in accordance with the present invention.
Figure 3A:
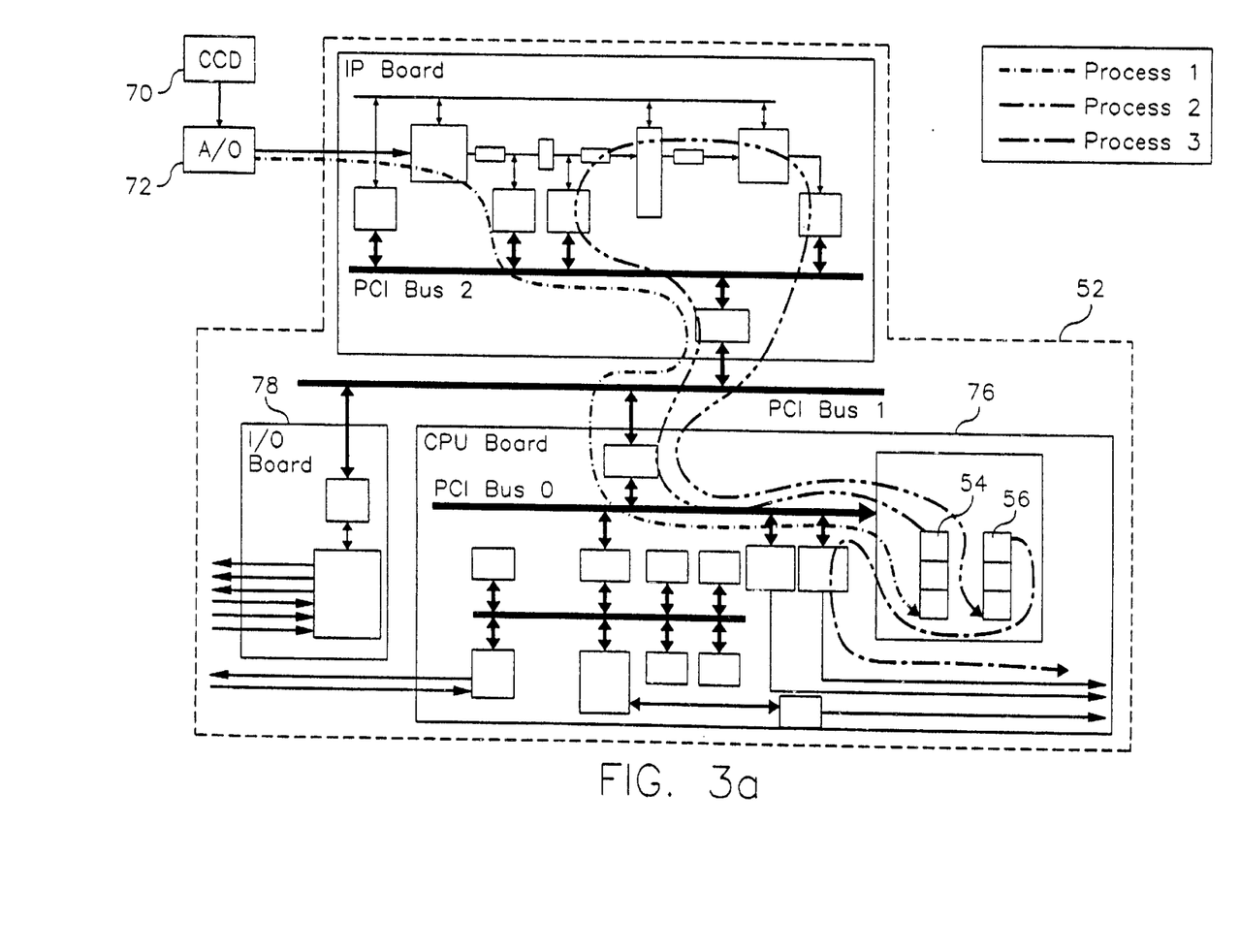
FIG. 3 is a more detailed schematic block diagram of the data path through a scanner in accordance with the present invention.
Figure 3B:
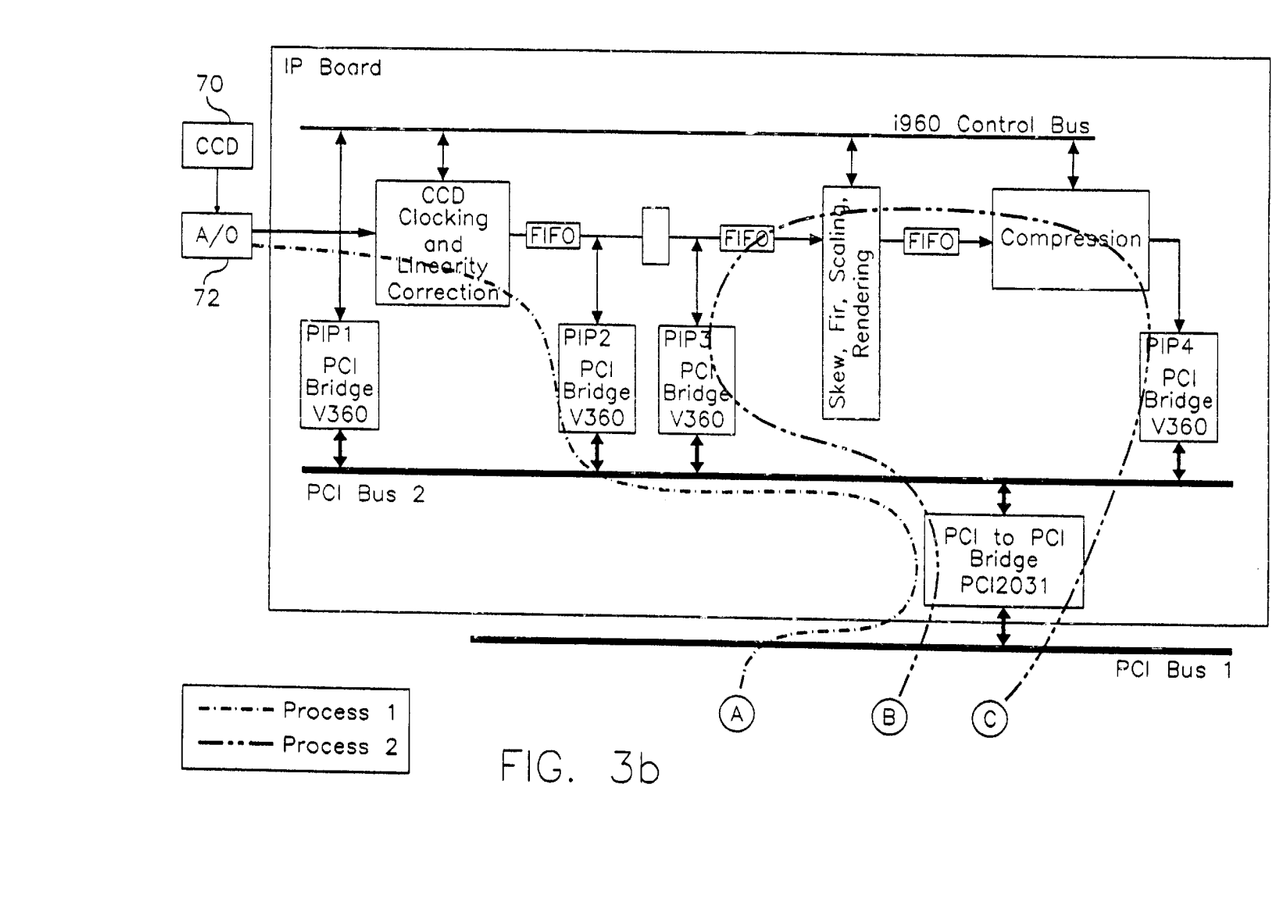
Figure 3C:
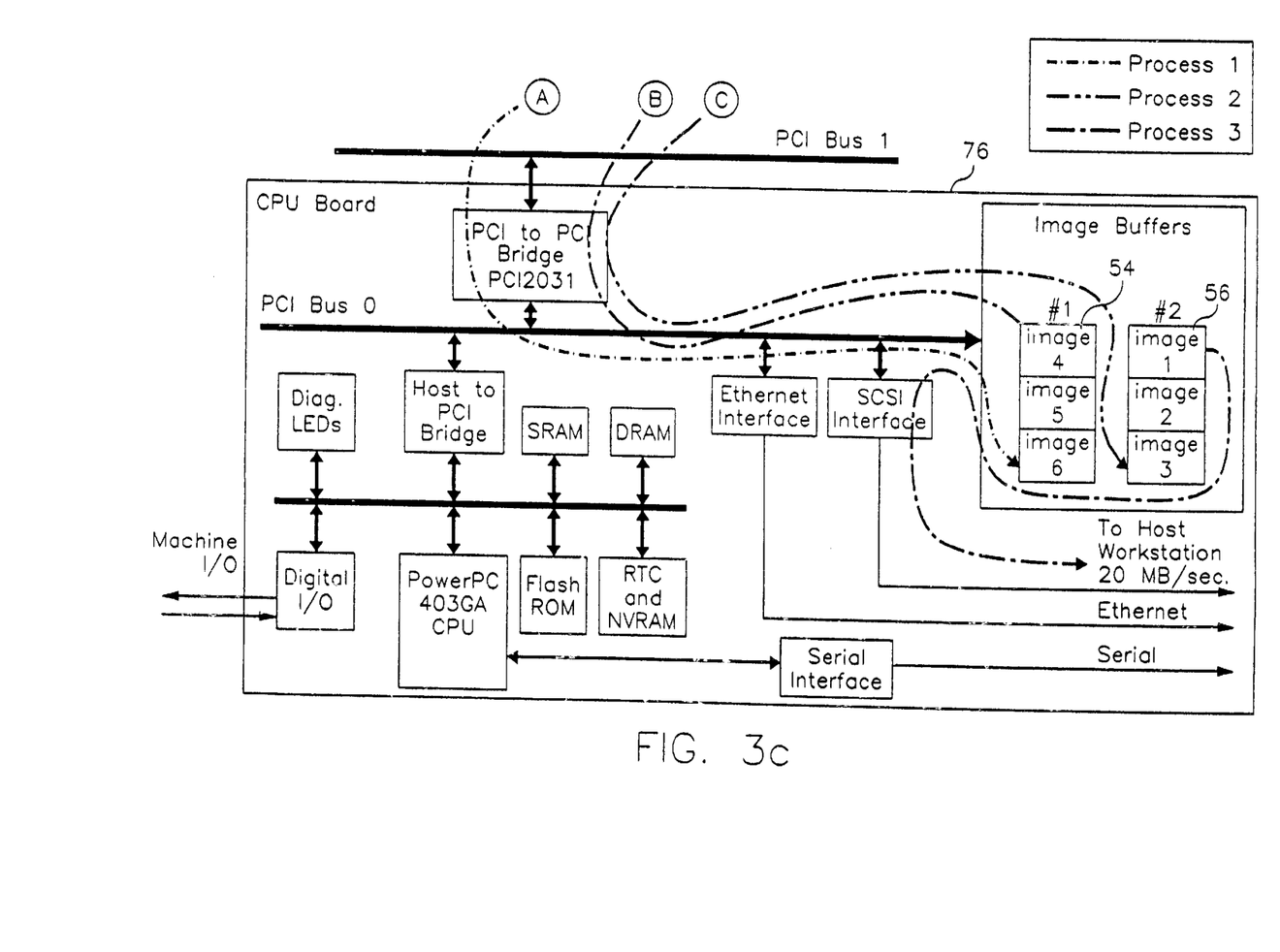
Figure 3D:
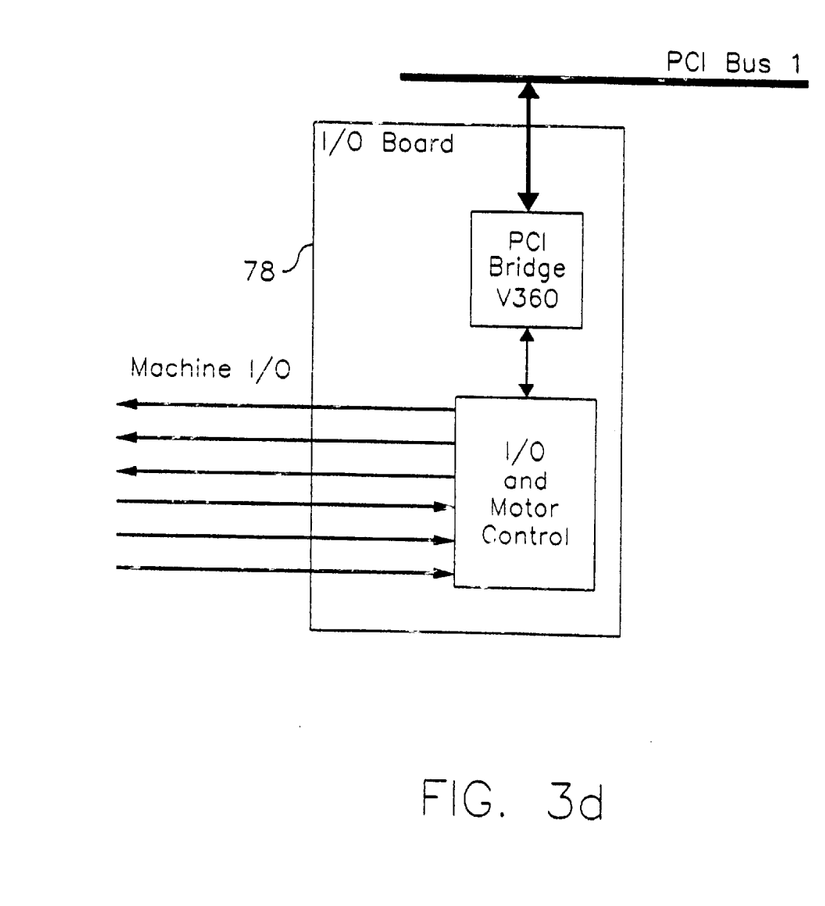
Figure 4A:
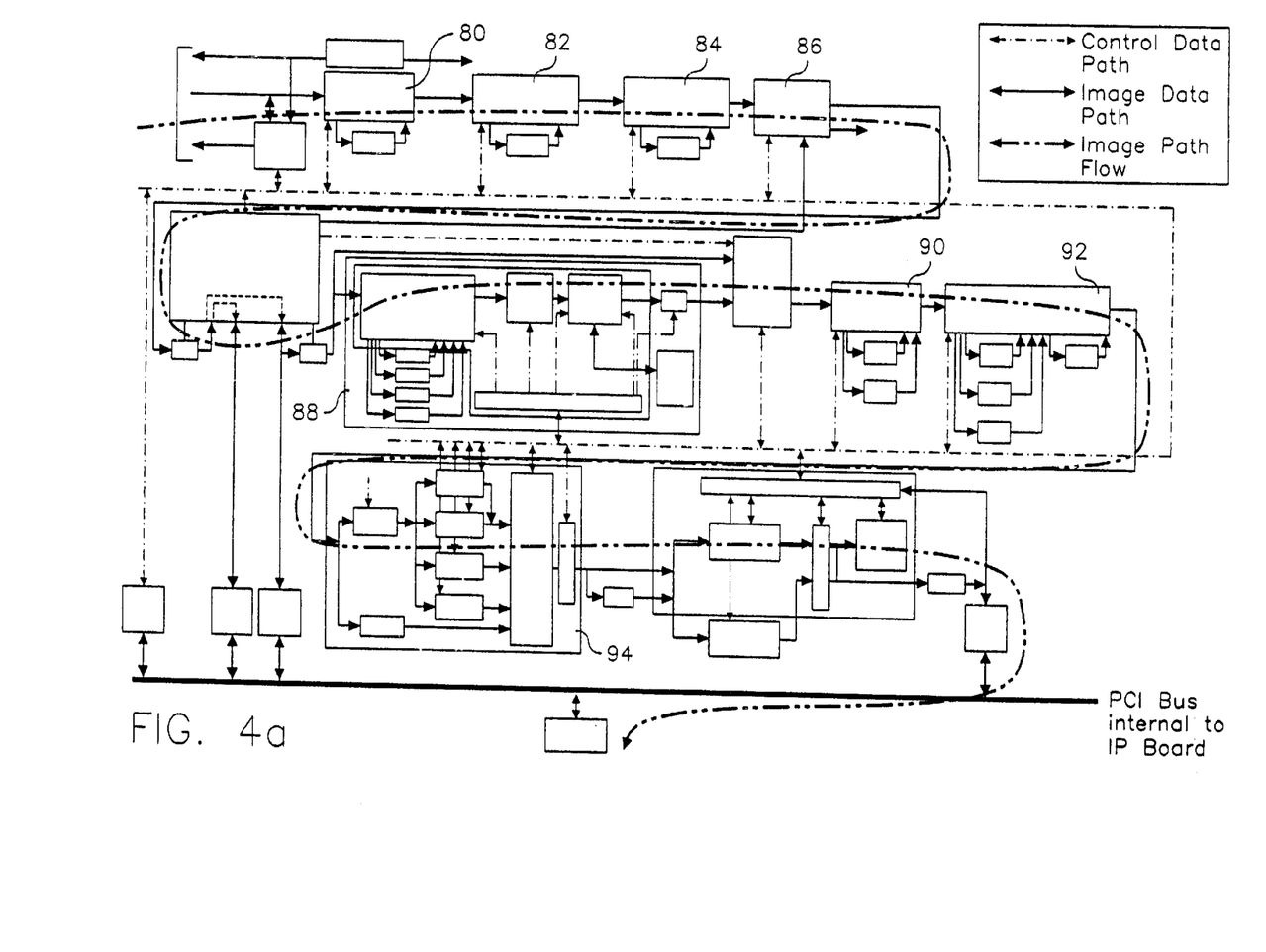
FIG. 4 is a more detailed schematic block diagram of an image processor in accordance with the present invention.
Figure 4B:
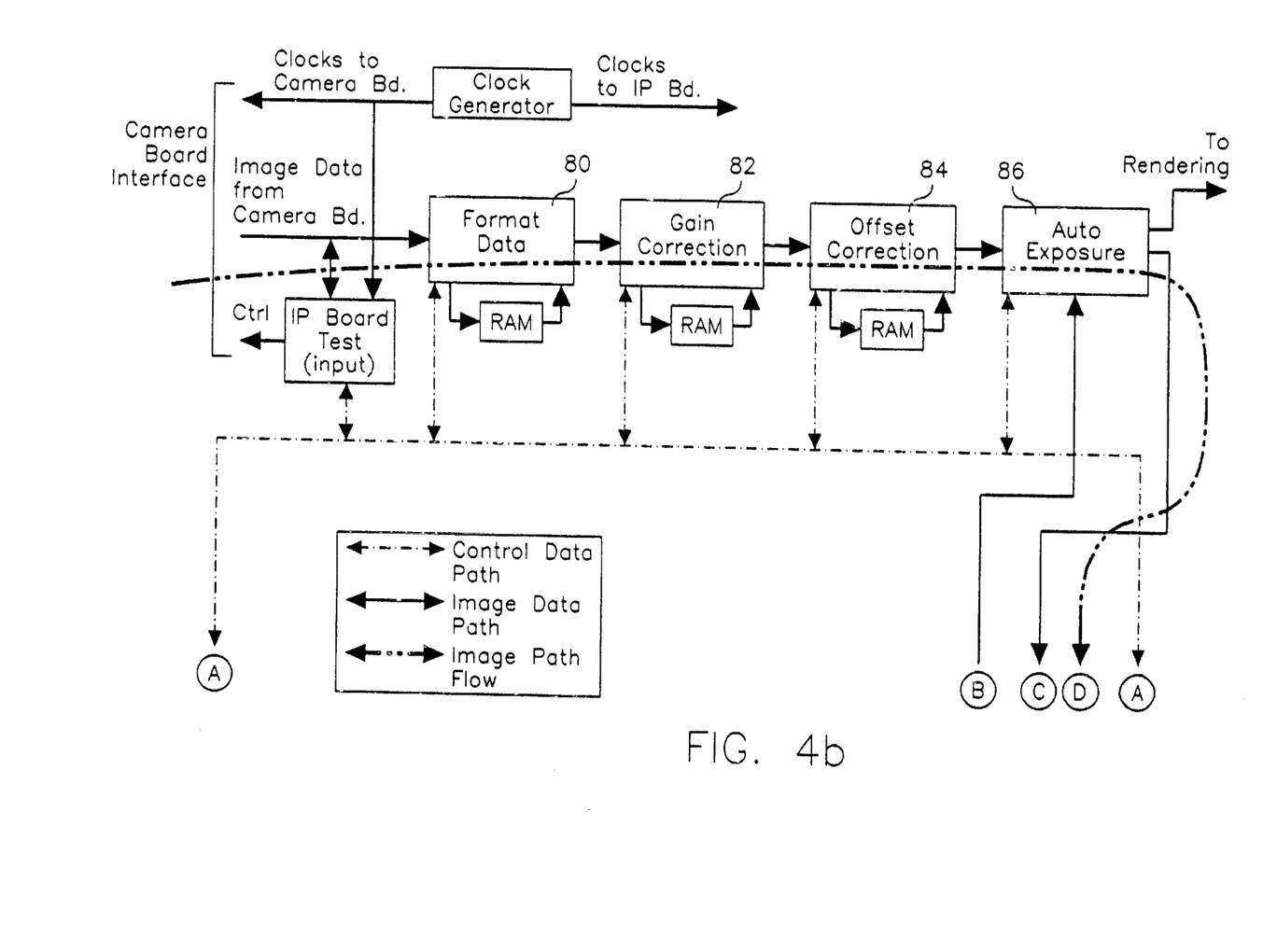
Figure 4C:
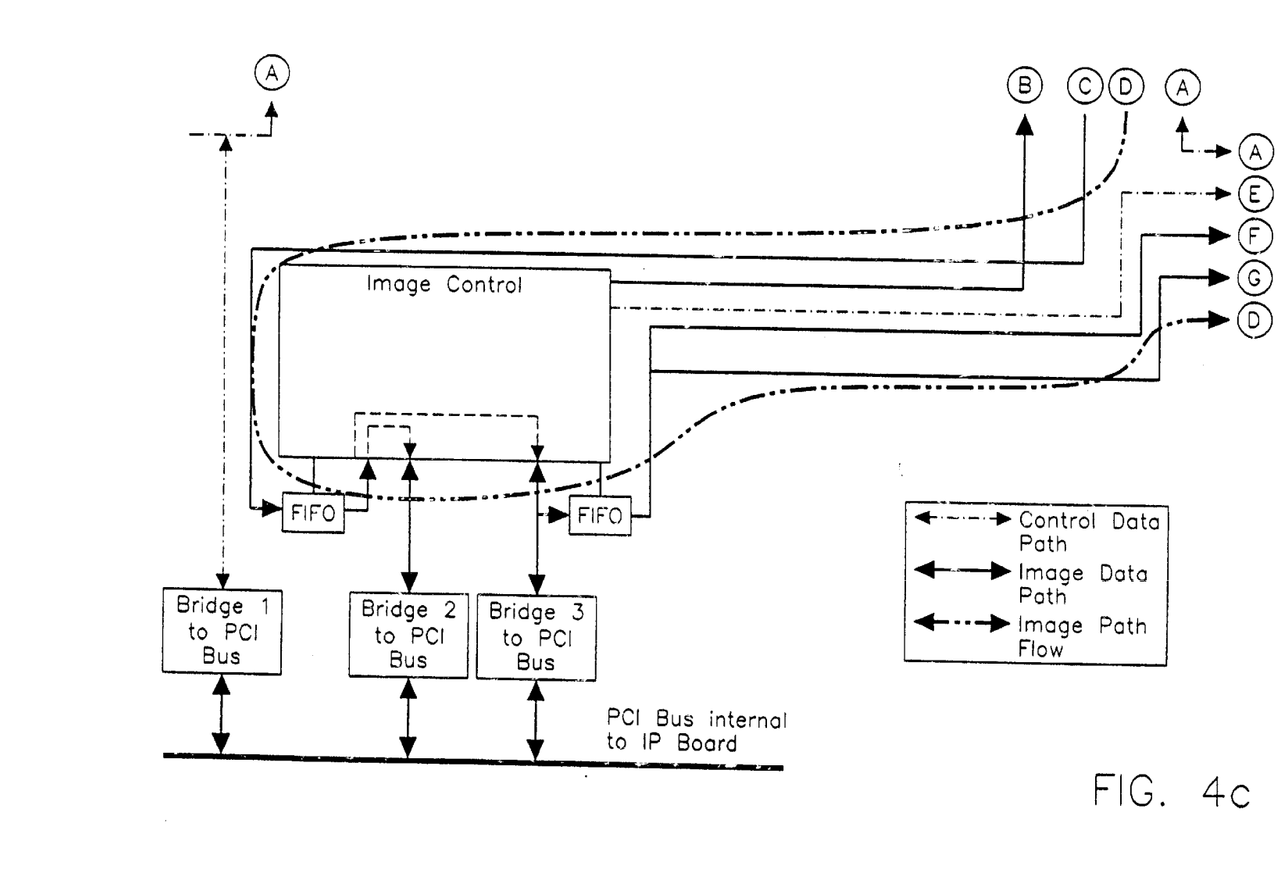
Figure 4D:
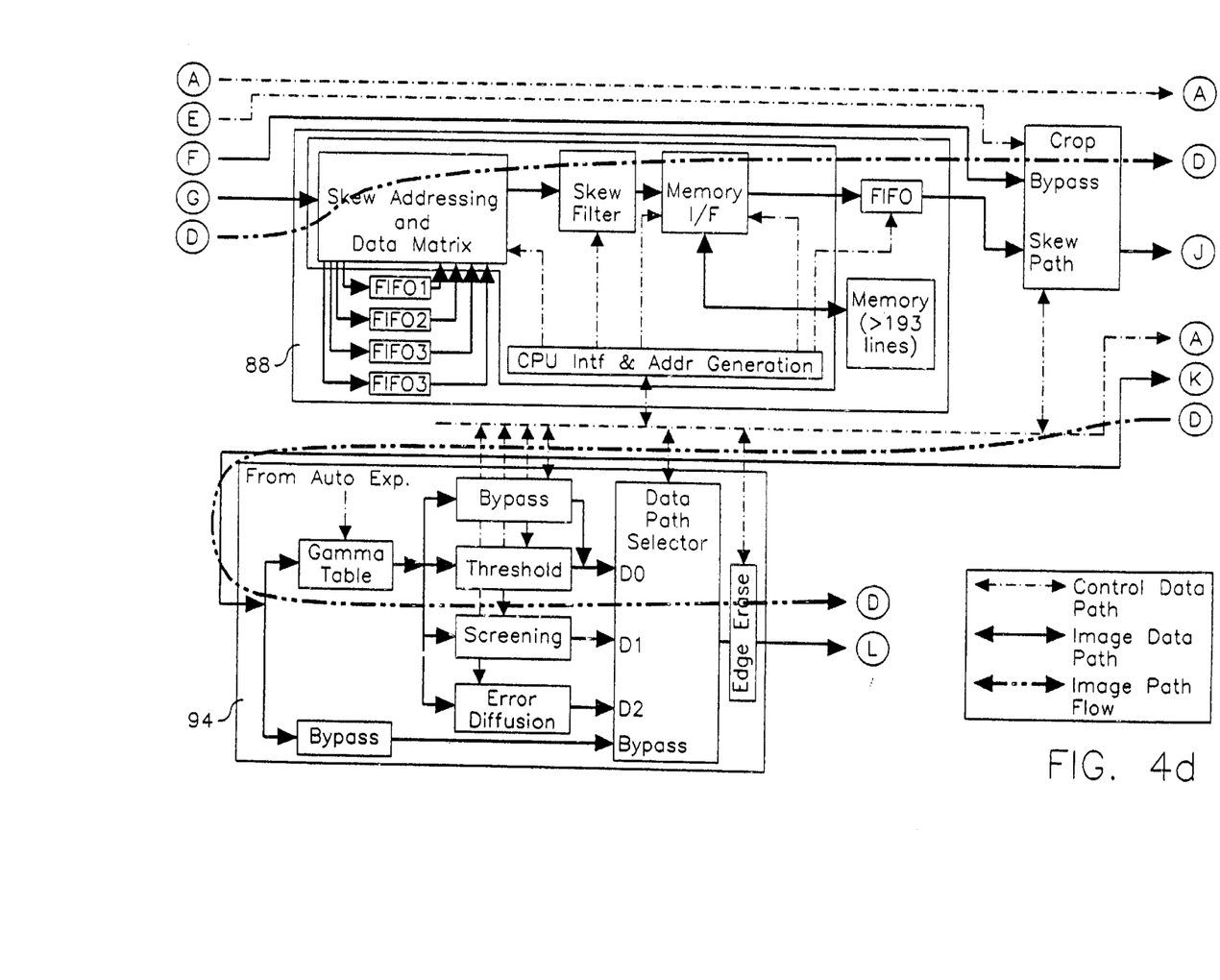
Figure 4E:
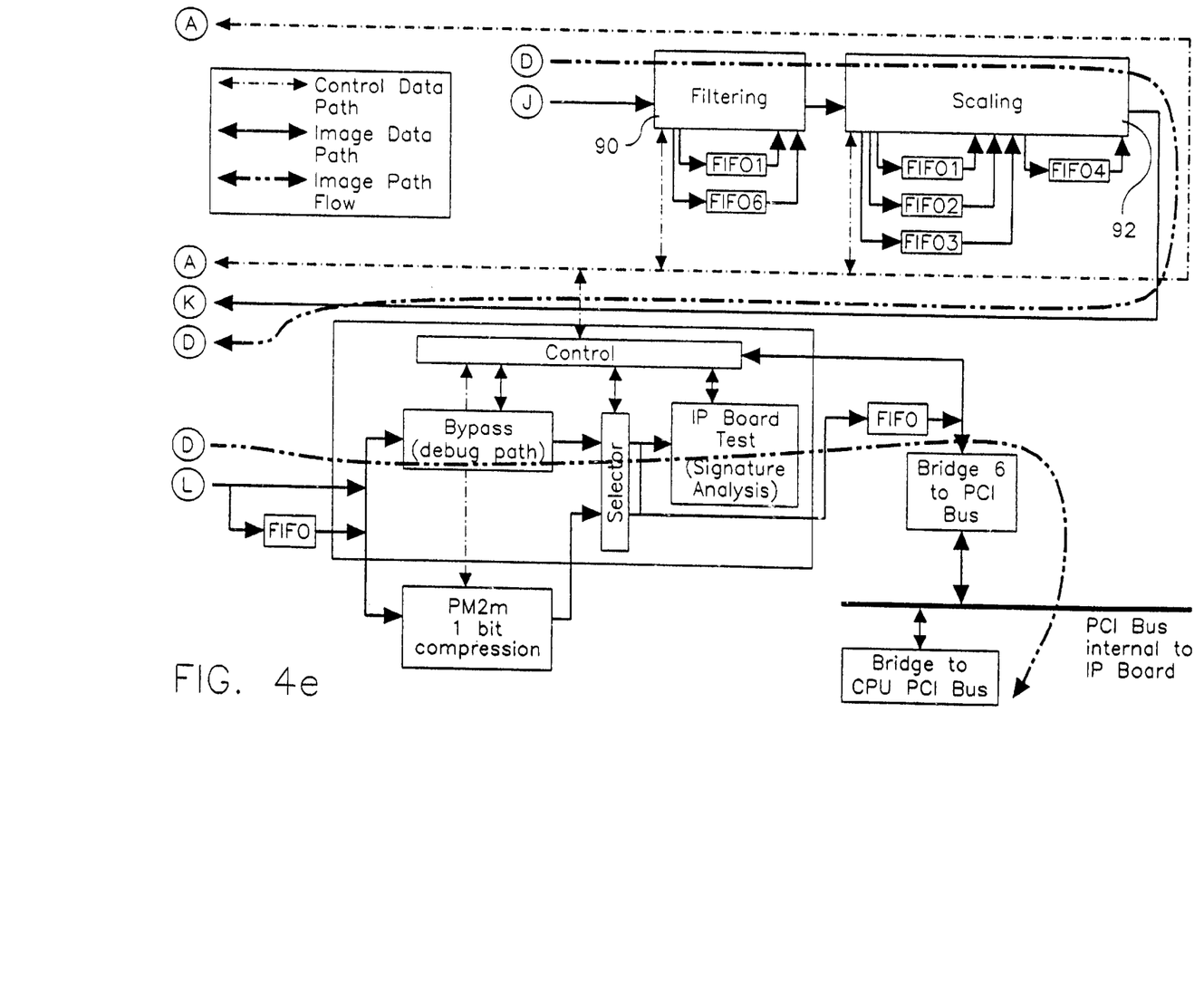

FIG. 2 illustrates the functional blocks of a scanner in accordance with the present invention. Included are an automatic document feeder 32, an illumination subsystem 34, an optical subsystem 36, a platen scanning mechanism 38, motion control and related sensors 40, scanner interface software 42, scanner control software 44, logic and control hardware 46, communication interface hardware 48, charge coupled devices and analog front end electronics 50, digital image processing (IP) 52, a first raw image data (RID) memory buffer 54 and a second, manipulated image data (MID) memory buffer 56. The digital image processor and buffers make up an IP block 60. The automatic document feeder, illumination subsystem, optical subsystem platen scanning mechanism and charge coupled devices and analog front end electronics provide digital image data to a memory buffer in "raw" form. That is, the original document has been read and digitized but little or no processing or manipulation has been performed on the image data to change the characteristics of the image. What image processing is most likely to occur at this stage is removal of system or hardware related image artifacts, such as CCD clocking and linearity correction, pixel correction etc.

The raw image data stored in the raw image data buffer may be utilized for a number of different purposes, as will be explained in further detail hereinafter. For instance, the raw image data may be sent directly to the user block 30 for display or printing. This path gives an operator the ability to review the scanned image and decide whether additional image processing is necessary, or whether the data needs to be altered by the digital image processor. It is beneficial that the data in this buffer be stored for as long as possible, the length of time being dependent on the amount of available memory.

Another path for the raw image data (RID) is into IP block for manipulation. The IP block receives raw image data (from a camera board interface via the buffer) to process it, and store it in off board memory (or local )located on a PCI bus. The image data stored in the off board memory may then be transferred to the host or it may be used by the digital image processor for additional processing. Processing may consist of multiple functions that manipulate the raw image data, such as pixel correction, skew correction, screen rendering, finite impulse response filtering, scaling, compression, error diffusion rendering, auto exposure, and others.

The manipulated data from the image processor is then deposited into a second manipulated image data (MID) buffer. Although there are shown two separate image buffers for exemplary purposes, both buffers might be located on the same memory chip, or on the same printed board. When the data in the MID buffer is needed, it is retrieved via the data interface.

Referring now to FIG. 3, there is shown an embodiment of the present invention, which includes a CCD 70 that provides analog image information to an analog to digital (A/D) converter 72. The digitized raw image data is passed through a clock generator and linearity correction block to the raw image memory buffer 54. The data passes is then extracted and passed through one or more image processing operations which manipulate the data before being deposited in a MID memory buffer 56. Image processing operations include but are not limited to skew correction, screen rendering, finite impulse response (FIR) filtering, scaling, compression, error diffusion rendering, and auto exposure.

Linearity correction compensates for nonuniformity in the outputs of the CCD devices given a constant input. Pixel correction corrects for individual pixel data which is deviant from expected pixel value. Skew correction corrects misalignment of the original document when scanned. Screen rendering, error diffusion, and thresholding are processes of reduction of the pixel data level (i.e. from 8 bits per pixel to 2 bits per pixel). FIR filtering is a low pass filtering technique to provide edge sharpening. Scaling is image enlargement or reduction. Compression is comprised of a typical data compression technique in order to reduce memory requirements for the image storage. Error diffusion rendering algorithm is an adaptive method that is derived from the following observation. In the simple binary threshold operation, once the printing decision for a pixel has been made, the error introduced by that decision is known. If a sample is 75% black and a black bit is printed, then there is now 25% of a bit too much black on the print. This error value is distributed among neighboring sample points. When too much black is printed, the error is added to the neighborhood, effectively pushing the neighbors a little closer to white. When not enough black is printed, the error is subtracted from the neighborhood, pushing them closer to black. In this method no screen is used. The texture generated depends strongly on the choice of neighbors and how the errors are distributed. Auto exposure corrects for inappropriate exposure levels. All of the foregoing image processing functions, and other image processing functions not mentioned but contemplated by present invention are known to those skilled in the art, the particular technique being utilized dependent upon many factors associated with the particular scanner design, and operator requirements.

Referring now to FIG. 4, it can be seen that the flow of data through the image processor is in the following order: data formatting 80, gain correction 84, auto exposure 86, skew correction 88, FIR 90, Scaling 92, and a block 94 which includes thresholding, screening, and error diffusion, (all methods of rendering).

An example of one form of data manipulation performed by the IP block is scaling. The purpose of scaling is to enlarge a digital image over the range of 100% to 400% (in 1% increments) or to reduce the size of an image over the range 100% to 25% (in 1% increments). Scaling is used to reduce and enlarge scanned images in both cross-track and in-track directions. In-track and cross-track scaling are independent so that it is possible to enlarge in one direction and at the same time reduce in the other direction. The 100% case and any reduction settings (in both directions) will be able to run at full productivity. When using reduction settings, the algorithm will decide on a pixel by pixel basis whether the pixel is to be saved in the final image (with interpolation performed) or discarded. The 100% case will, of course, decide to keep every pixel. In enlargement, additional pixels are inserted in the image in order to enlarge. The image to enlarge will first be sent into memory and then extracted and enlarged. The system runs at the same clock speed for enlargement, it is just processing more data. With the use of the raw data image buffer, the scanner motor speed therefore need not change because scaling is accomplished algorithmicly, or mathematically by converting the stored raw data into "scaled" image data (data representing a scaled image to be used by the reproduction apparatus or marking engine).

Figure 5:
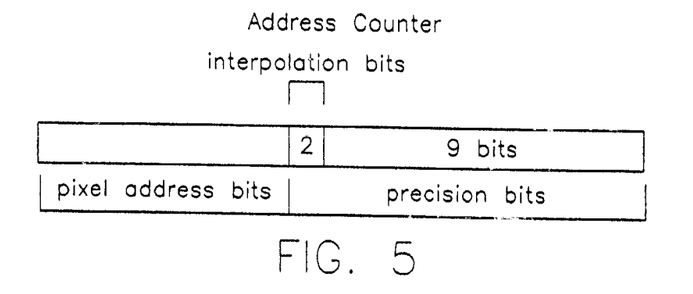
FIG. 5 is a schematic representation of an address in an address counter in accordance with the present invention.
Figure 6:
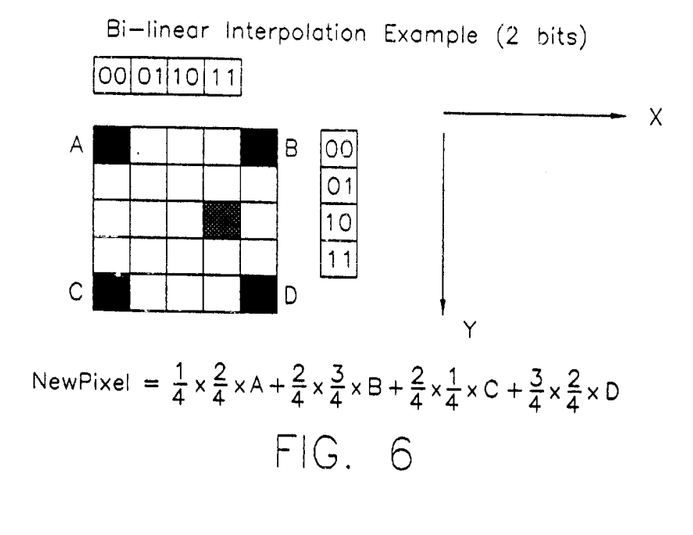
FIG. 6 is an illustration of a bi-linear interpolation example for a pixel in accordance with the present invention.

One such algorithm for scaling uses a bi-linear interpolation method, which utilizes the value of the current pixel and three surrounding pixels to determine the value of the saved pixel. Because the position of the desired output pixel can fall within a sub pixel location, a method of interpolating the pixel value from the surrounding pixels is required. In the bi-linear interpolation method, there are interpolation precision bits and pixel address bits. Two dimensional scaling can be readily accomplished with the use of address registers which define the pixel position of the pixel to be computed for the output scaled image. The registers have an integer and a fractional part. The fractional part of the registers have a user defineable number of precision and interpolation bits. The number of precision bits affects the difference between desired and actual scale factors. More precision bits results in less error. FIG. 6 illustrates this address counter in interpolation bits. FIG. 5 illustrates the address counter components. A computed delta count (based on selected scale factor) is added to the address counter for each input pixel. This values is computed as:

$$\text{delta} = 2^{\wedge}(\text{precision bits})/\text{scale factor}.$$

As an example, if 11 precision bits are used, then $2^{11}$= 2048; and if the scale factor is 150% or 1.5, then delta is 2048/1.5=1365. The delta range=512–8192 (for 11 precision bits and 25% to 400%).

To achieve independent X and Y scaling requirement, two delta variables (a cross track delta and an in track delta) must be computed. Two separate address counters must be provided for each axis.

When enlarging, the address count is computed by adding the enlargement value to the previous value in the address counter accumulator for each output pixel. Bits 9 and 10 determine the interpolation factors to use for interpolating between pixels. There is both a cross-track and in-track accumulator calculating in parallel, therefore the final interpolation factor is based on the results of both accumulators. Bit 11 can be thought of as a roll-over bit. When this bit is a '1' the address counter rolls over to the next pixel. FIG. 6 illustrates how a "new pixel" value is determined. Surrounding a given pixel A, there is a 4×4 matrix of the possible locations that can be interpolated. These 16 locations are addressed using the 2 bits from the cross-track accumulator (Bits 9 and 10) and the in-track accumulator (Bits 9 and 10).

Another method of scaling in accordance with the present invention is to store image lines in FIFO memory and then extract one at a time and determine whether to retain the data or not.

Rather than add the magnification value to the accumulator, add one pixel value (800H) for each input pixel to the accumulator and then compare it against the magnification value to determine if there is a roll-over case. When the accumulator value is equal or greater than the magnification value then a roll-over case has occurred and the pixel is a retained. In this method, bits 9 and 10 are no longer automatically the interpolation bits. The interpolation bit determination becomes if bits 0 to 11 in the accumulator are zero then the interpolation="00", otherwise if the bits 0 to 8 in the accumulator are zero then use the following table:

| bits 10 and 9 | Interpolation results |
| --- | --- |
| 00 | 00 |
| 01 | 11 |
| 10 | 10 |
| 11 | 01 | otherwise the interpolation=the inverse of bits 9 and 10

With the translation of the interpolation bits above in both the cross-track and in-track directions the same table can be used for either reduction or enlargement or a combination to determine the correct factors on A,B,C,D, to determine the new pixel value. The calculation is as follows:

$$((A\_Factor \times A) + (B\_Factor \times B) + (C\_Factor \times C) + (D\_Factor \times D))/16$$

FIG. 6 illustrates the bi-linear interpolation calculation when 2 bits of interpolation are used. The integer portion of the X and Y address registers point to pixel A. The desired output pixel lies within the region of pixels A, B, C and D. In FIG. 6, the fractional part of the X address register contains 11 in the two interpolation bits. The fractional part of the Y address register contains 10 in the two interpolation bits.

FIG. 6 illustrates the location of the desired output pixel relative to the four pixels by which it is bounded. Note the grid is 4×4 (3 bits of interpolation would have resulted in an 8×8 grid). The equation for computing the new pixel has coefficients of 2/16 for A, 6/16 for B, 2/16 for C and 6/16 for D. Note the weighting is greater for the pixels which are closer to the desired pixel location.

The address registers are used to specify the x and y coordinates of location of the desired pixel. The following examples illustrate this function.

EXAMPLE 1

Reduction 50% 11 bits precision (2^11=2048)

For each address increment address by 2048/.50=4096

TABLE 1

Example 1 Data

| Output Pixel | Full Precision Address | Floating Address (Full Precision Address/2048) |
|---|---|---|
| 0 | 0 | 0.0 |
| 1 | 4096 | 2.0 |
| 2 | 8192 | 4.0 |
| 3 | 12288 | 6.0 |
| 4 | 16384 | 8.0 |

EXAMPLE 2

Reduction 75% 11 Bits Precision (2^11=2048)

For each address increment address by 2048/.75=2731

TABLE 1

Example 2 Data

| Output Pixel | Full Precision Address | Floating Address (Full Precision Address/2048) |
|---|---|---|
| 0 | 0 | 0.0 |
| 1 | 2731 | 1.333 |
| 2 | 5462 | 2.667 |
| 3 | 8193 | 4.000 |
| 4 | 10924 | 5.334 |

EXAMPLE 3

Enlargement 200% 11 Bits Precision (2^11=2048)

For each address increment address by 2048/2.0=1024

TABLE 1

Example 3 Data

| Output Pixel | Full Precision Address | Floating Address (Full Precision Address/2048) |
|---|---|---|
| 0 | 0 | 0.0 |
| 1 | 1024 | 0.5 |
| 2 | 2048 | 1.0 |
| 3 | 3072 | 1.5 |
| 4 | 4096 | 2.0 |

In the present scaling technique, a multibit image is captured at a normal rated speed into a multibit RID buffer. A second process is then launched shortly after the image capture starts to read the multibit image from the RID buffer and process the image through the IP to the proper enlargement scale required by an operator. An advantage of this technique is that the FIR filter does not need adjusting for unsymmetrical apertures, since it was captured at normal operating speeds. The electronic hardware creates data at the standard bandwidth, but reads the data at a slower rate than the incoming image. Since the scaling operation is operating in the same mode as the rest of the prepress operations, the operator can tweak the scaling window and scale setting without rescanning the original.

Referring now to FIG. 7, operation of a scanner in accordance with the present invention begins by placing the scanner in the prepress mode. This mode permits an operator to view the image or image data in different states, such as between the raw image data produced by the scanner and a "finished" version of the image after the image has been manipulated through one or more various image processing operations or somewhere in between. One or more originals are loaded and scanned. The RID is written into the RID buffer. If the operator wishes to use the RID, it is then sent to the user interface or printer. Otherwise, the RID is manipulated in one or more image processing operation(s). After image processing, the MID is written into a MID buffer. When requested, the MID is sent to the user interface for viewing or printing. The RID is kept in the RID buffer until there is no longer any use for it. In this manner, a scanned image of an original can be edited, viewed or scanned, and re-edited and viewed or scanned over and over until an operator considers the image worthy of printing in high volumes, without the need for rescanning. Such a mode for a scanner is considered a prepress mode for it permits acitivity before the image goes to "press".

It is appreciated that the present invention contemplates a novel feature for a high speed, high volume, high definition scanner. Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A scanner operated by an operator to convert an original printed image to electronic data which is utilized by a user device, the scanner comprising:

a converter provided within the scanner for converting the image into raw digital image data (RID);

a RID memory buffer provided within the scanner for storing the RID;

an image processor provided within the scanner for manipulating the RID to provide manipulated image data (MID);

a MID memory buffer provided within the scanner for storing the MID;

an output data path to transfer the RID and/or the MID to a user device for display or printing, and;

a controller to direct the RID and/or MID to the user device, wherein the RID is kept in the RID memory buffer until there is no longer any use for it.

2. A scanner in accordance with claim 1, wherein the RID manipulating comprises scaling the image.

3. A scanner in accordance with claim 1, wherein the RID manipulating comprises rotating the image.

4. A scanner in accordance with claim 1, wherein the controller is programmed by the operator.

5. A scanner in accordance with claim 1, further comprising a feeder for feeding the originals to the converter.

6. A scanner operated by an operator to convert an original printed image to electronic data which is utilized by a user device, the scanner comprising:
   a converter provided within the scanner for converting the image into raw digital image data (RID);
   a RID memory buffer provided within the scanner for storing the RID;
   an image processor provided within the scanner for manipulating the RID to provide manipulated image data (MID);
   a MID memory buffer provided within the scanner for storing the MID;
   an output data path to transfer the RID and/or the MID to a user device for display or printing, and;
   a controller for directing the RID in at least two modes of operation comprising a direct scan mode of operation to provide RID on the output data path directly to the user device and an image processing mode of operation for providing the MID on the output data path directly to a user device, wherein the RID is kept in the RID memory buffer until there is no longer any use for it.

7. A scanner in accordance with claim 6, wherein the RID manipulating comprises scaling the image.

8. A scanner in accordance with claim 6, wherein the RID manipulating comprises rotating the image.

9. A scanner in accordance with claim 6, wherein the controller is programmed by the operator.

10. A scanner in accordance with claim 6, further comprising a feeder for feeding the originals to the converter.

11. A scanner operated by an operator to convert an original printed image to electronic data which is utilized by a user device, the scanner comprising:
   functional blocks comprised of
     a converter for converting the image into raw image data (RID);
     a RID memory buffer for storing the RID;
     an image processor for manipulating the RID to provide manipulated image data (MID);
     a MID memory buffer for storing the MID wherein the RID and/or the MID are provided on an output data path to transfer the RID and/or the MID to a user device for display or printing, wherein the RID is kept in the RID memory buffer until there is no longer any use for it.

12. A scanner in accordance with claim 11, wherein the RID manipulating comprises scaling the image.

13. A scanner in accordance with claim 11, wherein the RID manipulating comprises rotating the image.

14. A scanner in accordance with claim 11, wherein the controller is programmed by the operator.

15. A scanner in accordance with claim 11, further comprising a feeder for feeding the originals to the converter.

* * * * *